United States Patent Office 3,387,803
Patented June 11, 1968

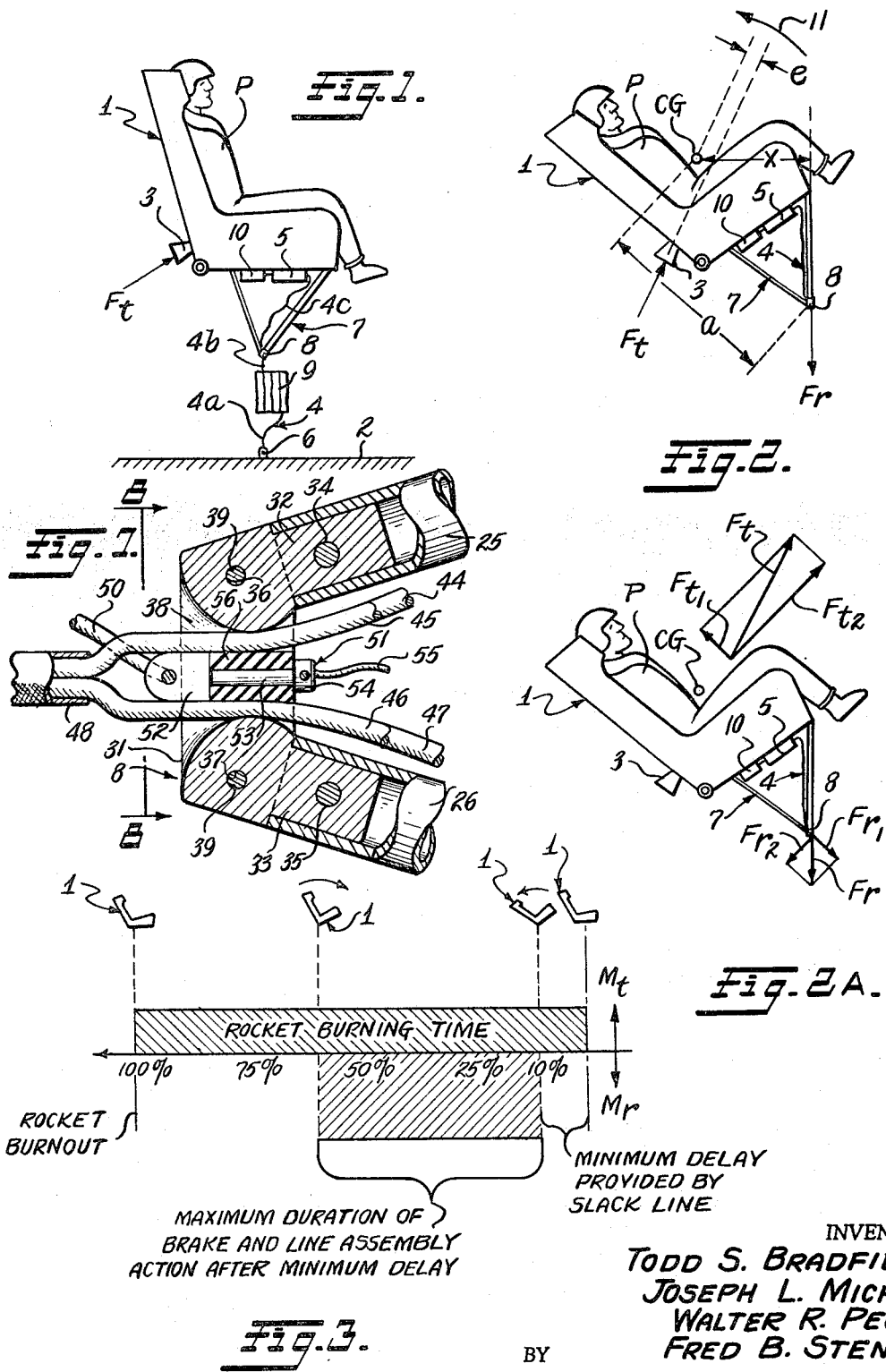

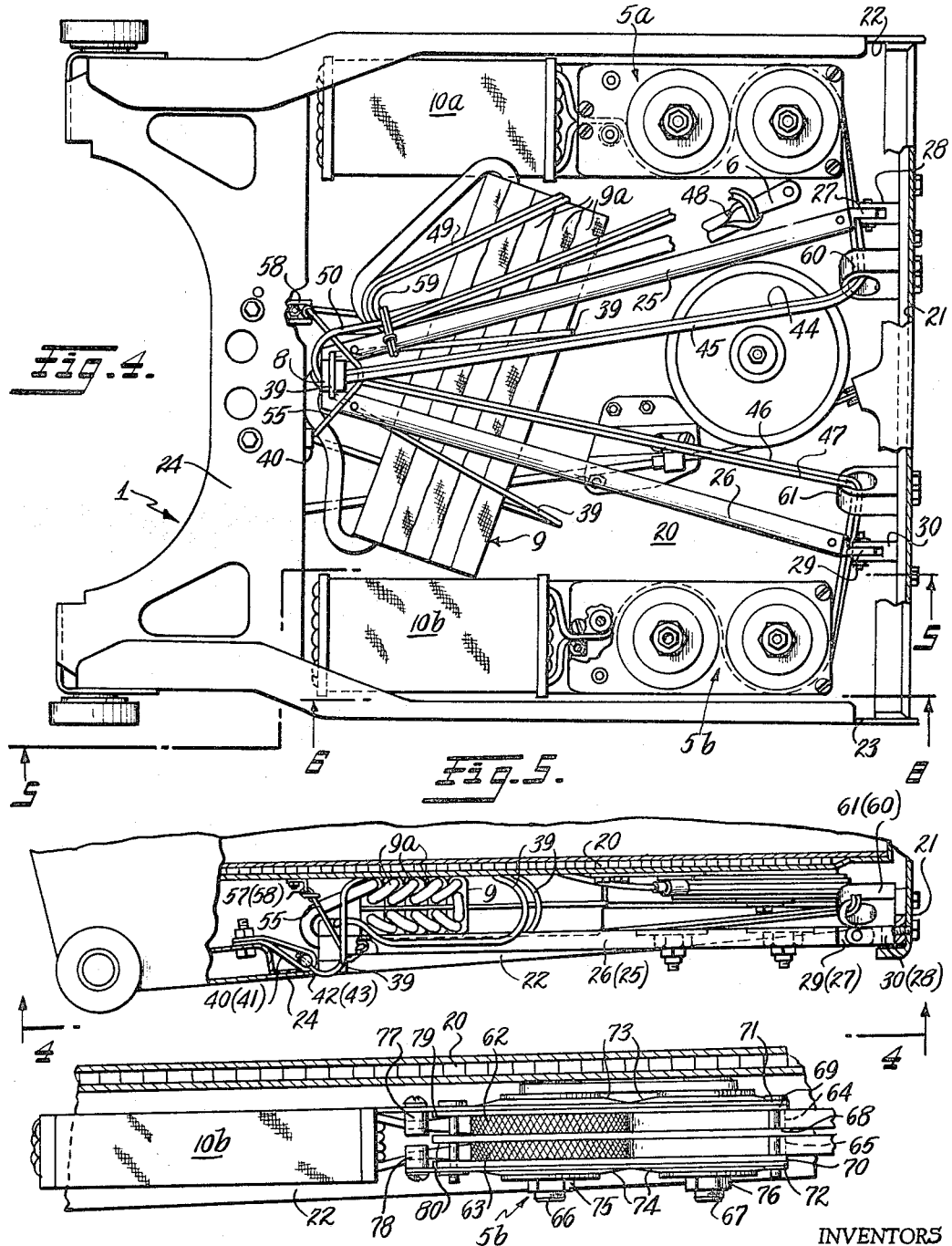

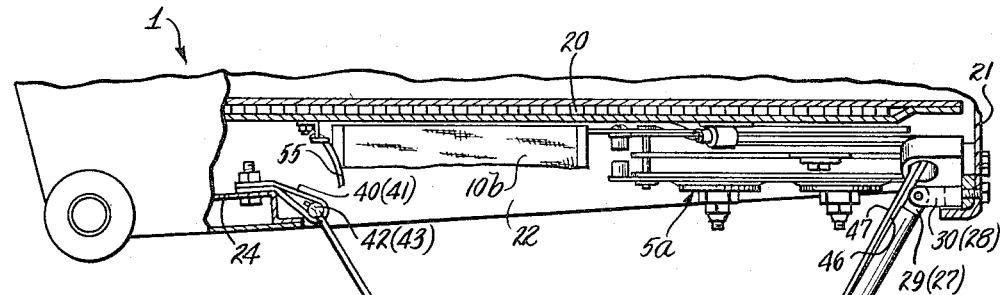
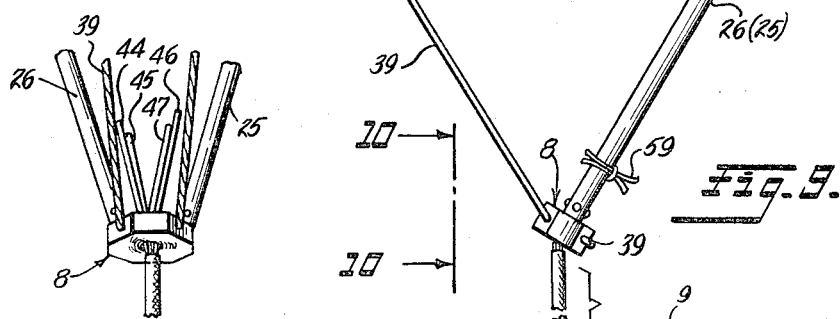
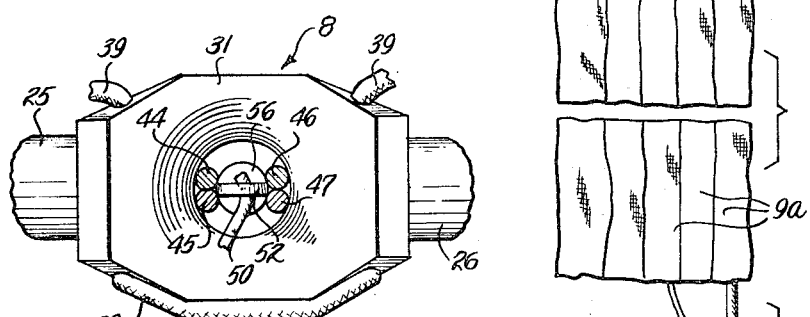
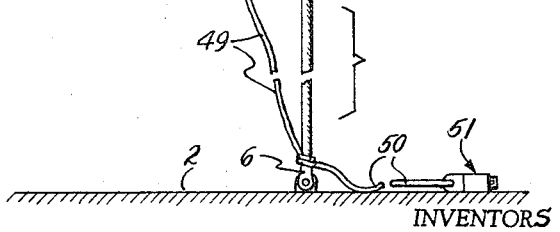

3,387,803
LOAD RECOVERY SYSTEMS
Todd S. Bradfield, Joseph L. Michal, Walter R. Peck, and Fred B. Stencel, Asheville, N.C., assignors to Stencel Aero Engineering Corporation, Arden, N.C., a corporation of North Carolina
Filed Oct. 21, 1965, Ser. No. 499,867
11 Claims. (Cl. 244—122)

ABSTRACT OF THE DISCLOSURE

An arrangement for stabilizing a load, such as an ejection seat, projected from an aircraft and propelled by a rocket attached to the load. A brake line is connected between the load and the aircraft. The brake line runs through a brake, and, when taut, prevents end over end rotation of the load which can occur if the line of action of the thrust of the rocket is offset even slightly from the center of gravity of the load. The slip line has a slack portion of such length that the line does not become taut and exert a rotation preventing moment of force until a predetermined time after the reaction motor exerts thrust. The slack allows a sufficient amount of rotation of the load to assure that the moment arm from the line of action of the slip line to the center of gravity of the load has significant length when the restoring force of the brake line is first applied. The long moment arm not only provides stabilization but also provides better trajectory of the projected load. In addition, the brake line acts during a time interval not greater than 50% of the thrust generating period of the rocket.

---

This invention relates to the art of recovering loads from air and space craft and is particularly applicable to systems of the type in which an ejection seat, a capsule or other form of load carrier is first separated from the craft and then recovered by parachute. The invention provides improvements in systems of the type disclosed in U.S. Patent No. 3,103,331, issued Sept. 10, 1963, to Fred B. Stencel.

In the load recovery systems disclosed in said patent, the ejection seat or other load carrier is equipped with a rocket arranged to generate thrust with the thrust line so oriented that, when the seat has been initially catapulted from the craft and so assumes an initial attitude, the thrust will project the seat along a predetermined path. However, the center of gravity of the combination of the seat and its occupant cannot be predetermined accurately because of the variations in weight, and in weight distribution, of persons who may occupy the seat. Accordingly, the thrust line of the rocket is likely to be offset from the center of gravity which pertains at the time recovery is to be accomplished, and operation of the rocket then produces a rotational impulse tending to cause the seat to rotate as it is projected by the rocket, such rotation making it difficult if not impossible to recover the occupant of the seat by parachute. To overcome this difficulty, the system disclosed in U.S. Patent No. 3,103,331 employs a slip line and brake assembly, with the slip line attached to the craft, the brake mounted on the seat, and the line and brake coacting to provide a restraining force acting on the seat in opposition to the rotational moment which results during projected travel of the seat if the thrust line of the projection rocket is offset from the center fo gravity of the combination of the seat and its occupant. Though recovery systems of this type have been highly successful, problems have been encountered in accomplishing the desired stabilization and at the same time maintaining the optimum trajectory inclination of the ejection seat or other load carrier, while still avoiding undue complexity and excessive dissipation of the energy of the projection rocket.

It is accordingly a general object of the invention to provide a load recovery system of the type described which allows effective control of the rotational rate of projected load carrier as well as correction of the trajectory of the projected load carrier.

Another object is to devise such a system which will accomplish control of both rotation and trajectory with a minimum dissipation of projecting energy.

A further object is to provide a slip line and brake system of greater simplicity and dependability.

Yet another object is to provide such a load recovery system, particularly when applied to recovery of personnel, which will avoid possible damage to the load being recovered.

To illustrate the manner in which the foregoing and other objects are attained in accordance with the invention, particularly advantageous embodiments thereof will be described in detail with reference to the accompanying drawings, which form part of this specification, and wherein:

FIG. 1 is a semidiagrammatic view of an aircraft ejection seat in accordance with the invention, the ejection seat being shown in a typical position immediately after separation from the aircraft;

FIG. 2 is a diagram illustrating typical relationships of projecting and stabilizing forces applied to the ejection seat of FIG. 1;

FIG. 2A is a diagram similar to FIG. 2 but with vector diagrams illustrating certain force relationships characterizing the invention;

FIG. 3 is a chart illustrating the manner of operation of the invention;

FIG. 4 is a bottom plan view of the ejection seat of FIG. 1 with portions of the system stowed;

FIG. 5 is a view, partially in side elevation and partly in vertical section, of the ejection seat of FIG. 1 with parts thereof shown in the positions occupied immediately after projection of the seat from the aircraft;

FIG. 6 is a view, partially in side elevation and partly in section, taken on line 6—6, FIG. 4;

FIG. 7 is an axial sectional view of the line collecting eye of a bridle employed in the ejection seat;

FIG. 8 is a view, partly in transverse cross section and partly in elevation, taken on line 8—8, FIG. 7;

FIG. 9 is a view similar to FIG. 5 but showing the bridle extended to its operative position; and FIG. 10 is a fragmentary elevational view showing a portion of the bridle of the system of FIG. 4, in extended position.

One typical system in accordance with the invention is illustrated diagrammatically in FIG. 1 and includes an ejection seat indicated generally at 1, the seat being conventional and adapted to be mounted in usual fashion in a predetermined position on the aircraft 2. As is well known in the art, the ejection seat is equipped with a catapult (not shown) for effecting initial separation of the seat from the aircraft, at the time recovery of the occupant P is to be accomplished, and a projection rocket 3 operative to generate thrust along thrust line $F_t$ to project the combination of the seat and its occupant a substantial distance, usually on the order of 200–300 feet, away from the aircraft.

Initially interconnecting the aircraft and the ejection seat is a brake and line assembly, described in detail hereinafter, comprising a slip line 4 of predetermined length and a restraining brake 5. In this embodiment of the invention, the brake 5 is mounted on the ejection seat, one end of the slip line is secured to the aircraft by a suitable fitting 6, and the slip line extends through the brake and is engaged thereby in such fashion that the brake is operative to yieldably resist passage of the slip line through the brake. The seat is equipped with an initially stowed bridle, indicated generally at 7, including a guide 8 through which the slip line extends, the guide 8 serving as the effective point of force-transmitting attachment between the slip line and the seat. The bridle 7 is so constructed that, once the seat has been catapulted from the aircraft, the guide 8 is offset rearwardly, relative to the direction of projected travel of the seat, from the center of gravity of the combination of the seat and its occupant.

Starting at fitting 6, the slip line first includes an initially slack portion 4a, and an additional initially slack portion which, at the time of separation of the seat from the aircraft, is stowed within a slack line pouch 9. The slip line then extends through guide 8 and brake 5, and the remainder of the slip line, terminating in the free end thereof, is stowed within a second pouch 10. Considering the situation which pertains when the ejection seat still occupies its normal position on the aircraft, there is a predetermined total length of slack slip line, including portion 4a, the portion stowed in slack line pouch 9, and portions 4b and 4c, which must become taut, as the seat is projected away from the aircraft, before the slip line 4 and brake 5 can coact to apply an effective stabilizing force to the seat. When the ejection seat has travelled far enough from the aircraft to render the initially slack portion of the slip line taut, further projected travel of the seat causes the slip line to be drawn through brake 5, with the free end of the line ultimately escaping through the brake and the line then being entirely disconnected from the seat.

Referring now to FIG. 2, it will be seen that, when the bridle 7 has been brought to its operative, extended position as a result of the slip line becoming taut, the guide 8 is spaced from the center of gravity CG of the combination of the seat 1 and its occupant P, in a generally trailing direction, by the distance $a$. Assuming that the occupant P is a short, relatively heavy person, the thrust line $F_t$ of rocket 3 may, for example, be spaced below the center of gravity CG by a distance $e$, so that the thrust generated by rocket 3 applies a rotational impulse tending to cause the seat to turn in the direction indicated by the arrow at 11. Such rotation of the seat causes guide 8 to swing, and the restraining force which the now-taut slip line applies to the seat accordingly acts through a moment arm $x$ which increases in length as the seat turns in the first 90° of rotation which tends to result because of the offset between thrust line $F_t$ and the center of gravity CG. The effect of the slip line 4 and brake 5, once the slip line has become taut, is thus to apply to the seat a restoring force $F_r$ which acts through moment arm $x$ opposition to the rotational impulse applied by the rocket thrust.

Unlike similar systems of this type, the system of this invention is characterized by a significant, predetermined delay between initiation of thrust generation by rocket 3 and initiation of effective action on the projected seat by the brake and slip line assembly, this delay being of such duration as to allow a significant amount of rotation of the seat to occur as a result of the rocket thrust, if the rocket thrust is in fact displaced from the center of gravity CG. Allowing significant rotation of the seat to occur before initiating the restoring action of the brake and line assembly assures that the moment arm $x$ will have a significant length when the restoring force is first applied and, since the restoring force acts through the moment arm $x$, the desired stabilization of the seat can be achieved more efficiently than if the action of the brake and line assembly commenced concurrently with the action of rocket 3. Advantageously, as illustrated in FIG. 3, the delay between start of rocket burning time and start of significant effect of the brake and line assembly is at least 10% of the total period of rocket burning. The particular delay to be employed can be predetermined accurately by selection of the total length of slack line, consisting of portions 4a, the portion stowed in pouch 9, and portions 4b and 4c.

In addition to delaying the initiation of the brake and line assembly action, the system of the invention advantageously employs a limited total period of stabilizing effect of the brake and line assembly, with this total period not exceeding 50% of the total duration of the rocket burning time, as indicated graphically in FIG. 3. Thus, for example, with the total slack line length selected to accomplish initiation of the effect of the brake and line assembly when approximately 10% of the rocket burning time has elapsed, the direct effect of the brake and line assembly is terminated at a time not later than 60% of the rocket burning time, this time of termination being predetermined by the total length of the slip line 4. Such limitation of the total period of direct action by the brake and line assembly, coupled with the delay in initiating this action, achieves maximum efficiency in stabilization of the seat because the restoring force is largely applied when the moment arm $x$ has a significant length, only a minimum amount of the force applied by the brake and line assembly thus acting in opposition to the projection thrust from the rocket. Thus, the energy supplied by the rocket is more fully utilized to project the seat and its occupant.

The system also has the important advantage of accomplishing markedly better control of the trajectory of the projected seat than has heretofore been possible. It will be unrerstood that initial separation of the seat from the aircraft by any of the conventional catapults will place the seat in a dependably predetermined attitude at the time the rocket 3 is fired. Since the rocket 3 is arranged on the ejection seat in such fashion as to provide a desired trajectory when the seat is properly oriented at the time the rocket is fired, and since the action of the brake and line assembly is delayed until at least 10% of the rocket burning time has elapsed, firing of the rocket is followed by effective commitment of the seat to substantially the desired trajectory. Assuming that there is a significant displacement $e$ of the thrust line $F_t$ from the center of gravity, a significant rotation of the seat will develop during the first 10% of the rocket burning time. If no stabilizing force were applied, one ultimate result of such rotation would be that the seat would depart from the desired trajectory because of the departure of the rocket thrust line from the angular position necessary to maintain that trajectory. Under circumstances of low altitude and displacement of the rocket thrust line above the center of gravity, departure of the seat from the desired trajectory can be not only extreme but also of very dangerous effect, with the rocket ultimately driving the seat and its occupant into the ground. However, in the system of this invention, bringing the brake and line assembly into action after the initial delay serves to return the seat to that attitude in which the rocket is again properly oriented to assure the desired trajectory.

If the optimum condition of zero rotation (pitch) rate of the seat is to be achieved at burnout of rocket 3, the direction of rotation of the ejection seat must be reversed during the period of direct action of the brake and line assembly. This reversal in the rotational direction causes the moment arm $x$ to decrease during the latter portion of the time period of direct action of the brake and line assembly. As the moment arm $x$ becomes smaller, the component of the restoring force $F_r$ which opposes the action of rocket 3 becomes larger, and a larger proportion of the rocket thrust is dissipated simply in opposing the brake and line assembly rather than in projecting the seat. Accordingly, the longer is the time period of action of the brake and line assembly, the poorer is the efficiency of the system.

It has also been found that it is important to limit the magnitude of that portion of the force from the brake and line assembly which acts parallel to the spine of the occupant of the seat to not more than 90% of that portion of the force from the rocket which acts parallel to the spine of the occupant. Referring to FIG. 2A, it will be seen that the force $F_t$ applied to the seat by rocket 3 can be considered as having a component $F_{t1}$ parallel to the spine of the occupant of the seat and a component $F_{t2}$ at right angles thereto. Similarly, the force $F_r$ applied to the seat by the brake and line assembly can be considered as having corresponding components $F_{r1}$ and $F_{r2}$. If $F_{r1}$ were allowed to become approximately equal to or greater than $F_{t1}$, one effect of the brake and line assembly would then be to decelerate the seat to such an extent that, during the time period of action of the brake and line assembly, the occupant P and the seat would become separated by a small distance. Then, since the rocket 3 still would be supplying thrust when the free end of slip line 4 ran out of brake 5, the seat would again accelerate and strike the occupant with a force having a component $F_{t1}$ large enough to injure the occupant. This danger is completely avoided, however, when $F_{r1}$ is so limited as not to exceed 90% of $F_{t1}$.

FIGS. 4–10 illustrate one specific, advantageous way in which the system described broadly with reference to FIGS. 1–3 can be constructed. The seat 1 is of conventional construction including a rigid bottom structure including the bottom wall 20, front wall 21 depending from wall 20, dependent side flanges 22 and 23, and a back portion including a flat portion 24 spaced below and parallel to bottom wall 20.

The bridle 7 is normally stowed in inactive position, as seen in FIGS. 4 and 5, but extends automatically to its operative position, seen in FIG. 9, when the seat 1 is ejected from the aircraft. The bridle comprises two rigid struts 25 and 26 each pivotally connected to front wall 21. Thus, one end of strut 25 is provided with a tongue 27 disposed between the ears of a bracket 28, the tongue and the ears of the bracket being provided with parallel bores accommodating a pivot pin. Similarly, one end of strut 26 is equipped with a tongue 29 disposed between the ears of bracket 30, and a pivot pin which is coaxial with the pivot pin for strut 25 extends through tongue 29 and the ears of bracket 30. The struts are thus mounted for free pivotal movement relative to the seat, about an axis parallel to front wall 21.

Tongues 27 and 29 are angularly offset from struts 25, 26, respectively, so that the struts slant toward each other. The remaining ends of the two struts are rigidly joined by guide 8. As will be seen from comparing FIGS. 4 and 5, struts 25 and 26 lie in a common plane and are of such transverse dimensions and such length as to be capable of being pivoted upwardly to lie substantially parallel to bottom wall 20, in which position the struts are located above the bottom edge of front wall 21 and back portion 24.

As best seen in FIGS. 7 and 8, guide 8 includes an annular body 31 from which two divergent cylindrical projections 32 and 33 extend. Struts 25 and 26 are identical metal tubes. The ends of the struts which are located at guide 8 respectively embrace projections 32 and 33, the projections and the ends of the struts being suitably apertured transversely to accommodate fasteners 34 and 35, respectively, which fix the projections rigidly to the struts. Body 31 of guide 8 includes two parallel bores 36 and 37 which extend at right angles to the common plane of the struts and are disposed each on a different side of the slip line passage 38 defined by body 31.

The remaining two legs of bridle 7 are constituted by a flexible metal cable 39, the ends of the cable being attached to back portion 34 by metal straps 40 and 41, respectively. As seen in FIG. 5, each strap 40, 41 is bent upon itself, the two end portions of the bent strap being brought together and secured to the upper surface of portion 24 by a suitable fastener. The bent portion of each strap 40, 41 is apertured to accommodate cable 39. Cross pins 42 and 43, FIG. 5, are affixed to the respective ends of cable 39 and are each retained within the bent portion of a different one of straps 40, 41. At its central portion, cable 39 passes through bores 36 and 37 and over the outer surface of body 31. Accordingly, the cable 39 serves to limit downward pivotal movement of struts 25 and 26 relative to the seat, so as to determine the operative, downwardly extended position of the bridle.

In this embodiment, slip line 4 includes two pairs of identical braided nylon cords 44, 45 and 46, 47, like ends of all four cords being secured to the fixture 6 by which the slip line is attached to the aircraft 2. Portions 4a of the slip line, plus that portion stored in pouch 9, never pass through guide 8 and the corresponding portions of cords 44–47 are all contained within a single tubular fabric sheath 48, FIG. 4.

Pouch 9 is of fabric and of rectangular plan shape, the interior of the pouch being divided into a multiplicity of open-ended, parallel tubular portions 9a, FIG. 4. The slip line is arranged in a plurality of loops each releasably retained in a different one of the portions 9a of pouch 9, the arrangement being such that the slip line can pay out freely to a taut condition as the seat is catapulted from the aircraft.

Securely attached to fixture 6 are a retaining line 49, for the slack line pouch 9, and a bridle release line 50. Retaining line 49 simply runs to and is secured to one end of pouch 9. Release line 50 terminates in a plug 51, FIG. 7, having an enlarged head 52, a shank 53, and a trailing end enlargement 54, the head 52 and the enlargement 54 each being provided with a transverse bore to accommodate the release line 50 and a tie-down cord 55, respectively. A gum rubber sleeve 56 embraces shank 53, being retained between head 52 and enlargement 54, the normal diameter of sleeve 56 being such that, when the cords 44–47 are run through passage 38 and plug 51 is inserted in the passage, all of cords 44–47 are held frictionally between sleeve 56 and the wall of passage 38.

As shown in FIGS. 4 and 5, the tie-down cord 55 extends beneath struts 25 and 26 and thence upwardly with its ends secured respectively to brackets 57 and 58 which are rigidly mounted on the lower surface of bottom wall 20. Though adequate to retain bridle 7 in its stowed position as seen in FIG. 4, the tie-down cord is of a predetermined tensile strength such as to break under the force applied by release line 50 as the seat is catapulted from the aircraft. Thus line 50 is decidely stronger than cord 55 so that, as the seat travels away from the aircraft and line 50 becomes taut, cord 55 is broken and plug 51 is pulled out of guide 8 so that the bridle is freed to move to the extended position seen in FIG. 9. Commencing at fixture 6, lines 49 and 50 are run together beside strut 25, being initially tied thereto by a break cord 59 which is ruptured before line 50 applies tension to plug 51.

Considering the system to be as seen in FIGS. 4 and 5, with the bridle stowed, cords 44, 45 and 46, 47 extend from guide 8 generally between struts 25, 26 and toward the front wall 21. Rigidly secured to wall 21, on the side thereof directed inwardly of the seat bottom, are two guide eyes 60 and 61, the two guide eyes being located between struts 25 and 26 with guide eye 60 adjacent strut 25 and guide eye 61 adjacent strut 26. Guide eyes 60 and 61 define smooth passages generally parallel to wall 21. Cords 44 and 45 extend through guide eye 60 to brake 5a, while cords 46 and 47 extend through guide eye 61 to brake 5b, the two brakes being identical but arranged in inverse relation to each other.

Each brake 5a and 5b includes rollers 62, 63 and 64, 65, the rollers 62 and 63 being arranged for rotation about the common axis afforded by a bolt 66, and rollers 64 and 65 being arranged for rotation about the common axis provided by a bolt 67. Rollers 62 and 64 are disposed between a central friction plate 68 and an outer friction plate 69. Rollers 63 and 65 are disposed between plate 68 and an outer friction plate 70. The entire assembly is retained between frame plates 71 and 72. A clamping force is applied to the assembly in a direction parallel to the axes of bolts 66 and 67 by coaction between the bolt heads, Belleville washers 73 and 74, and nuts 75 and 76. Thus, the frictional forces between the end faces of the rollers and the faces of friction plates 68, 69 and 70 which resist rotation of the rollers can be predetermined by adjusting nuts 75 and 76 to apply the proper force to stress the Belleville washers. Each brake also includes a pair of cord guides 77 and 78 and a pair of idler rollers 79 and 80 located at the end of the brake adjacent rollers 62, 63. In each brake 5a and 5b, the frame plate 71 projects beyond the end of the brake at which the cord guides 77 and 78 are located and is engaged within a tubular fabric pouch 10a, 10b, respectively, to retain the pouch in proper position relative to the brake, as will be clear from FIGS. 4 and 6. Each brake is rigidly mounted on bottom wall 20 by a suitable bracket 81, FIG. 6, retained by bolts 66 and 67.

After leaving guide eye 60, cord 44 enters brake 5a and extends around one-half of the periphery of roller 64, thence between rollers 64 and 62, around approximately one-half of the periphery of roller 62 to emerge between that roller and idler roller 79, and from the idler roller through guide 77 to pouch 10a where it is disposed in convolutions each retained by one of the segments of the pouch. Similarly, cord 45 extends from guide eye 60 around roller 65, between rollers 65 and 63, around roller 63 and idler roller 80, through guide 78, and to pouch 10a. Cords 45 and 47 are run through brake 5b in the same fashion, their free end portions being stowed in pouch 10b. The peripheral surfaces of rollers 63–65 are knurled, and the pairs of rollers 62, 64 and 63, 65 are spaced by a distance slightly less than the normal diameter of the cords, so that there is adequate frictional engagement between the cords and rollers to assure that the cords can be drawn through the brake only with attendant rotation of the rollers against the frictional restraining forces applied to the rollers by the friction plates.

Accordingly, once the ejection seat has travelled away from the aircraft by a distance sufficient to render the initially slack portions of cords 44–47 taut, further travel of the seat will cause the remainder of cords 44–47 to be drawn through brakes 5a and 5b so that the brakes and cords coact to establish the desired stabilizing force $F_r$, FIGS. 2 and 2A. After a predetermined amount of travel of the seat, the cords 44–47 simultaneously run out of the brakes 5a and 5b, so that the direct action of the brake and line assembly is terminated.

The use of the four cords 44–47 to constitute the slip line 4 in this embodiment of the invention provides the desired strength and elongation characteristics compatible with the total length of the slip line and the magnitude of the braking forces necessary to provide a force $F_r$ of the desired value. Further, the multiple-cord slip line provides an effective amount of brake and line assembly action even in the event of partial slip line failure, as in the breakage of one, two or three of the cords 44–47.

We claim:
1. In a load recovery system of the type described, the combination of:
   a load carrier adapted to be supported in a predetermined initial position on a craft capable of flight;
   power means operatively coupled to said load carrier and operative to project said load carrier away from the supporting craft in an initially predetermined direction when recovery is to be accomplished,
      said power means comprising reaction motor means mounted on said load carrier and operative to generate thrust for a predetermined time and with a thrust line oriented to project said load carrier generally in said predetermined direction so long as said load carrier continues to retain the same attitude which it assumed at initiation of its projected travel,
      said reaction motor means being so arranged relative to said load carrier that the line of thrust generated thereby may, depending upon the particular load, be offset from the center of gravity of the combination of said load carrier and the load so that the thrust generated by said reaction motor means produces a rotational impulse tending to cause said load carrier to rotate during its projected travel; and
   stabilizing means for initially constraining said load carrier substantially to said attitude and opposing said rotational impulse during the projected travel of said load carrier, said stabilizing means comprising a yieldable brake and line assembly initially interconnecting the craft and said load carrier and including:
      a slip line of predetermined length,
      brake means engaged with said slip line to resist movement of said slip line relative to said brake means, and
      a bridle mounted on said load carrier and including a guide through which said slip line extends, said bridle being movable between an initial stowed position and an extended operative position in which said guide is spaced from said load carrier,
   said brake, bridle, and line assembly being so connected to said load carrier that the effective point of attachment between said brake and line assembly and said load carrier will be offset from said center of gravity, during the projected travel of said load carrier, to provide a moment arm through which the restraining force afforded by said brake and line assembly is applied to said load carrier, said moment arm increasing as said load carrier begins to traverse the first 90° of the rotation tending to result from said rotary impulse,
      said slip line being arranged with a predetermined amount of slack, when said load carrier is supported in said predetermined position on the craft, which slack is substantially greater than the distance between said load carrier and guide, when extended, and is not eliminated until said load carrier has been projected through a predetermined distance from the supporting craft, the amount of such slack being such that said brake and line assembly does not begin to restrain said load carrier until at least 10% of the period of time during which said reaction motor means generates thrust has elapsed,
      the effective length of said slip line being so predetermined that the time period during which said brake and line assembly acts to restrain said load carrier does not exceed 50% of the period of time during which said reaction motor means generates thrust.

2. A load recovery system according to claim 1, wherein:
   the amount of the slack of said slip line, and the effective length of said slip line are such that the time period during which said brake and line assembly acts to restrain said load carrier terminates before the end of the period of time during which said reaction motor means generates thrust.

3. A load recovery system according to claim 2, wherein:
   said load carrier is an ejection seat so constructed that the occupant's spine normally extends in a predetermined direction, and
   the component of the force applied to said seat by said brake and line assembly which acts parallel to the occupant's spine does not exceed 90% of the component of the force applied to said seat by said reaction motor means which acts parallel to the occupant's spine.

4. In a load recovery system of the type described, the combination of:
 a load carrier adapted to be normally supported in a predetermined position on a supporting craft and to be separated from the craft and projected away therefrom when recovery is to be accomplished;
 a bridle including a line guide,
  said bridle being mounted on said load carrier for movement between a stowed position and an operative position in which said line guide is spaced a substantial distance from said load carrier;
 a yieldable brake and line assembly for interconnecting the supporting craft and said load carrier, said assembly including:
  a brake, and
  a slip line extending operatively through said guide and engaged with said brake,
   said brake and line assembly being so arranged that said slip line has a predetermined amount of slack between said load carrier and the supporting craft when said load carrier is in its predetermined position on the craft, which slack is not eliminated until said load carrier has travelled a predetermined distance away from the supporting craft, elimination of said slack causing said brake and line assembly to exert a stabilizing force on said load carrier via said bridle; and
 a slack line retainer,
  a predetermined amount of the slack portion of said slip line being releasably stowed in said slack line retainer.

5. A load recovery system according to claim 4, wherein:
 said load carrier is an ejection seat;
 said bridle is mounted on the bottom of said seat; and
 said slack line retainer is of such size and configuration as to be accommodated between said bridle and said seat when said bridle is in its stowed position.

6. A load recovery system according to claim 4, wherein:
 said bridle comprises:
  two rigid struts each having one end connected to said guide,
  means for pivotally connecting the other ends of said struts to said load carrier, and
  a flexible member of predetermined length, an intermediate portion of said flexible member being connected to said guide and the ends of said flexible member being attachable to said load carrier, said flexible member becoming taut and thus limiting the extent of pivotal movement of said struts away from said load carrier, whereby said struts and said load carrier coact to position said guide in a predetermined location relative to said load carrier when said bridle is in its operative position.

7. A load recovery system according to claim 4, wherein:
 said load carrier is an ejection seat;
 said bridle comprises:
  two rigid struts each having one end connected to said guide, the other ends of said struts being spaced apart and pivotally connected to the bottom of said seat, and
  a cable of predetermined length having its ends spaced apart and connected to said seat, an intermediate portion of said cable being connected to said guide.

8. A load recovery system according to claim 7, wherein:
 said struts are pivotally connected to said seat adjacent the front thereof,
 the ends of said cable are connected to said seat adjacent the back thereof, and
 said struts are of such length as to extend for the greater part of the distance from the front to the back of said seat when said struts are pivoted to positions adjacent the bottom of said seat.

9. A load recovery system according to claim 4, wherein:
 said guide defines a passage through which said slip line extends, the system further comprising:
  a breakable retaining line initially arranged to retain said bridle in its stowed position;
  a plug extending within said passage and frictionally retained therein; and
  a release line adapted to be connected to the supporting craft,
   said release line being connected to one end of said plug and said retaining line being connected to the other end of said plug.

10. In a load recovery system of the type described, the combination of:
 a load carrier adapted to be supported in a predetermined initial position on a craft capable of flight;
 power means operatively coupled to said load carrier and operative to project said load carrier away from the supporting craft in an initially predetermined direction when recovery is to be accomplished,
  said power means comprising reaction motor means mounted on said load carrier and operative to generate thrust for a predetermined time and with a thrust line oriented to project said load carrier generally in said predetermined direction so long as said load carrier continues to retain the same attitude which it assumed at initiation of its projected travel,
  said reaction motor means being so arranged relative to said load carrier that the line of thrust generated thereby may, depending upon the particular load, be offset from the center of gravity of the combination of said load carrier and the load so that the thrust generated by said reaction motor means produces a rotational impulse tending to cause said load carrier to rotate during its projected travel; and
 stabilizing means for initially constraining said load carrier substantially to said attitude and opposing said rotational impulse during the projected travel of said load carrier, said stabilizing means comprising a yieldable brake and line assembly initially interconnecting the craft and said load carrier and including:
  a slip line of predetermined length, and
  brake means engaged with said slip line to resist movement of said slip line relative to said brake means,
 said brake and line assembly being so connected to said load carrier that the effective point of attachment between said brake and line assembly and said load carrier will be offset from said center of gravity, during the projected travel of said load carrier, to provide a moment arm through which the restraining force afforded by said brake and line assembly is applied to said load carrier, said moment arm increasing as said load carrier begins to traverse the first 90° of the rotation tending to result from said rotary impulse,
  said slip line being arranged with a predetermined amount of slack, when said load carrier is supported in said predetermined position on the craft, which slack is not eliminated until said load carrier has been projected through a predetermined distance from the supporting craft, the amount of such slack being such that said brake and line assembly does not begin to restrain said load carrier until at least 10% of the period of time during which said reaction motor means generates thrust has elapsed, the effective length of said slip line being so predetermined that the time period during which said brake and line assembly acts to restrain said load carrier does not exceed 50% of the period of time during which said reaction motor means generates thrust; and a slack line retainer, a predetermined amount of the slack portion of said slip line being releasably stowed in said slack line retainer.

11. A load recovery system according to claim 1, wherein said brake and line assembly further comprises:

a bridle mounted on said load carrier and including a guide through which said slip line extends, said bridle being movable between an initially stowed position and an extended operative position in which said guide is spaced from said load carrier.

References Cited
UNITED STATES PATENTS 3,103,331  9/1963  Stencel _____ 244—122

MILTON BUCHLER, *Primary Examiner.*

B. BELKIN, *Assistant Examiner.*